(12) United States Patent
Hong

(10) Patent No.: US 9,687,735 B2
(45) Date of Patent: Jun. 27, 2017

(54) HANDHELD GAME CONTROLLER ASSEMBLY ADAPTED TO COMBINE WITH VARIOUS PORTABLE ELECTRONIC DEVICES

(71) Applicant: DEXIN CORPORATION, New Taipei (TW)

(72) Inventor: Ching-Tsun Hong, New Taipei (TW)

(73) Assignee: DEXIN CORPORATION, New Taipei (TW)

( * ) Notice: Subject to any disclaimer, the term of this patent is extended or adjusted under 35 U.S.C. 154(b) by 286 days.

(21) Appl. No.: 14/555,488

(22) Filed: Nov. 26, 2014

(65) Prior Publication Data

US 2016/0030838 A1 Feb. 4, 2016

(30) Foreign Application Priority Data

Aug. 4, 2014 (TW) .............................. 103213811 A

(51) Int. Cl.
*A63F 13/20* (2014.01)
*A63F 13/24* (2014.01)
*A63F 13/98* (2014.01)
*A63F 9/24* (2006.01)

(52) U.S. Cl.
CPC .............. *A63F 13/24* (2014.09); *A63F 13/98* (2014.09)

(58) Field of Classification Search
CPC .. G07F 17/3293; G07F 17/3288; A63F 13/00; A63F 9/24; A63F 13/24
See application file for complete search history.

(56) References Cited

U.S. PATENT DOCUMENTS

| | | | | |
|---|---|---|---|---|
| 7,833,097 B1* | 11/2010 | Maddox | ................. | A63F 13/23 455/556.1 |
| 2004/0235566 A1* | 11/2004 | Hussaini | ................. | A63F 13/06 463/37 |
| 2008/0260371 A1* | 10/2008 | Hughes | ................. | G03B 15/05 396/155 |
| 2013/0092811 A1* | 4/2013 | Funk | ...................... | F16M 13/02 248/371 |
| 2014/0364232 A1* | 12/2014 | Cramer | ................. | A63F 13/92 463/37 |

* cited by examiner

*Primary Examiner* — Kang Hu
*Assistant Examiner* — Malina D Blaise
(74) *Attorney, Agent, or Firm* — Li & Cai Intellectual Property (USA Office

(57) ABSTRACT

A handheld game controller assembly adapted to combine with various portable electronic devices includes a game controller, a receiving receptacle, and an external retaining device. The game controller has a pair of holding portions and a transversal portion arranged between the holding portions. The receiving receptacle is fixed to the transversal portion. The external retaining device has a plugging unit detachably fixed to the receiving receptacle, an adaptor portion connected to the plugging unit, a supporting board obliquely extended from the adaptor portion, an extending board slidably connected to the supporting board, a prop stand pivotally connected to a top end of the extending board, and a pressing cover pivotally connected to the top end of the extending board. The bottom end of the prop stand can be rotated from the supporting position of the extending board, so that the external retaining device can stand independently.

11 Claims, 9 Drawing Sheets

HANDHELD GAME CONTROLLER ASSEMBLY ADAPTED TO COMBINE WITH VARIOUS PORTABLE ELECTRONIC DEVICES

BACKGROUND OF THE INVENTION

1. Field of the Invention

The instant disclosure relates to a handheld game controller assembly adapted to combine with various portable electronic devices; in particular, to a handheld game controller assembly with real buttons which can retain and electrically connect to a portable electronic device, so that user can operate the portable electronic device by the handheld game controller assembly.

2. Description of Related Art

A variety of video games is rapidly appearing on smart phones following the development and advancement of hardware efficiency on the smart phones. Smart phone is typically operated by a touch panel, and the operation interface is limited to only simulated buttons for the operation of video game. However, simulated buttons do not provide real tactile feedback at all, and the directional operation is also insensitive, thus the operation experience is greatly affected. The tactile feedback of touch panel still has unrealistic controls. For example, the tactile feedback does not have a real time response with respect to the user's pressure for each press of a simulated button.

In the other aspect, the traditional gamepad with buttons has well tactile feedback, thus many users still prefer the traditional gamepad. To address the above issues, a game controller is combined with a portable electronic device, such as smart phone or tablet PC, to improve operation of mobile phone and tablet PC, which is an issue intended to be resolved.

BRIEF SUMMARY OF THE INVENTION

The instant disclosure provides a handheld game controller assembly adapted to combine with various portable electronic devices, which provides an external retaining device detachably assembled to a game controller for retaining or supporting a portable electronic device, so that user can operate the portable electronic device through using the game controller.

According to one exemplary embodiment of the instant disclosure, a handheld game controller assembly is provided, which includes a game controller, a receiving receptacle, and an external retaining device. The game controller has a pair of holding portions and a transversal portion arranged between the pair of holding portions. The receiving receptacle is fixed and arranged at a front end of the transversal portion. The external retaining device has a plugging unit detachably engaged with and fixed to the receiving receptacle, an adaptor portion connected to the plugging unit, a supporting board extended obliquely from the adaptor portion, an extending board slidably connected to the supporting board; a prop stand, and a pressing cover pivotally connected to the top end of the extending board. The prop stand has a top end pivotally connected to a top end of the extending board, wherein a bottom end of the prop stand is rotatable away from the extending board in a supporting position, thereby the external retaining device is independently erected.

Thus, the present disclosure has advantages as followed. The present disclosure provides the external retaining device which is very easily and quickly assembled to or dismounted from the game controller. The external retaining device can be assembled to the game controller when it is demanded. Further, the external retaining device is able to stand independently to support different sizes of the portable electronic devices.

In order to further understand the instant disclosure, the following embodiments are provided along with illustrations to facilitate the appreciation of the instant disclosure; however, the appended drawings are merely provided for reference and illustration, without any intention to be used for limiting the scope of the instant disclosure.

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

Figure 1:
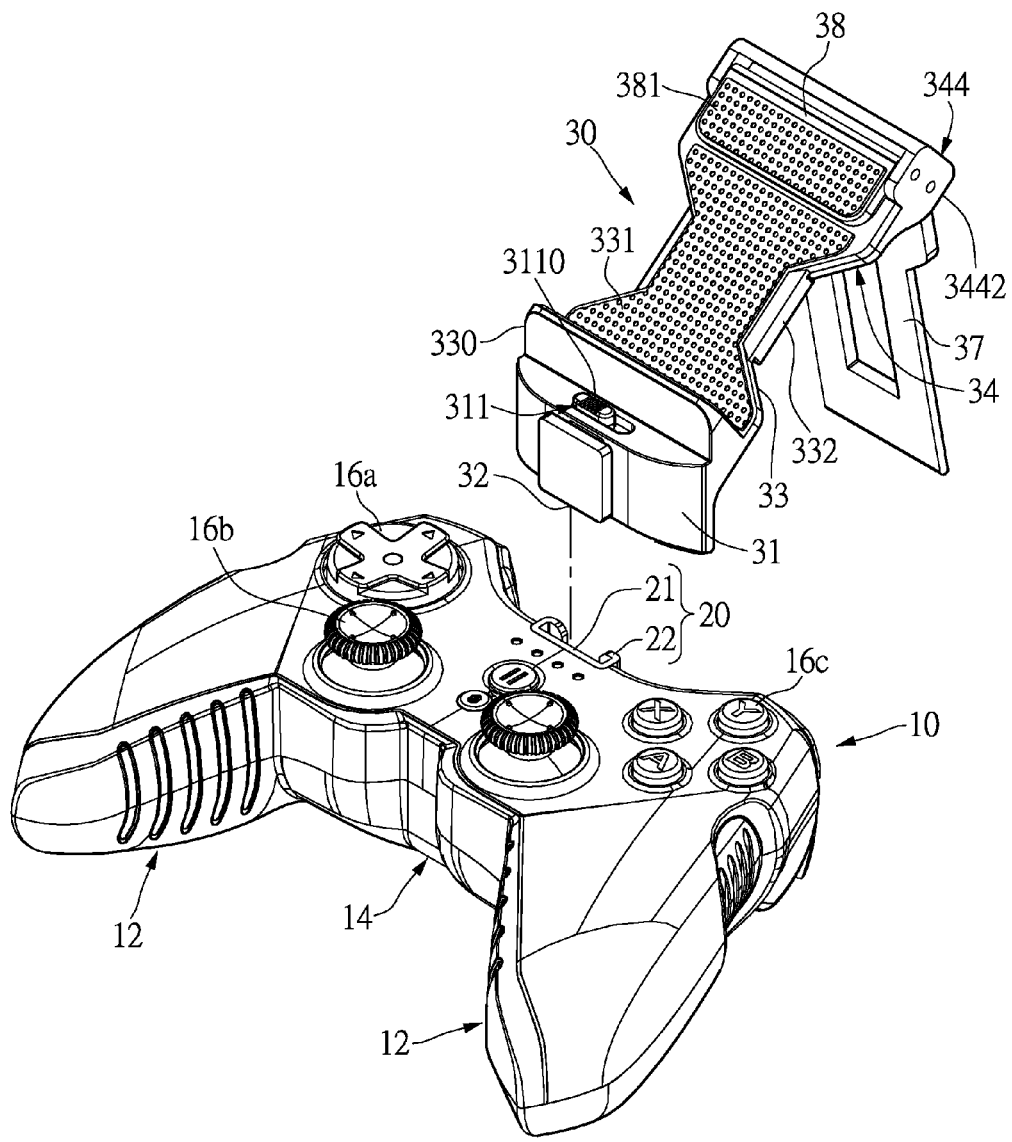
FIG. 1 is a perspective view showing a handheld game controller assembly adapted to combine with various portable electronic devices (separated from an external retaining device) of the instant disclosure.
Figure 2:
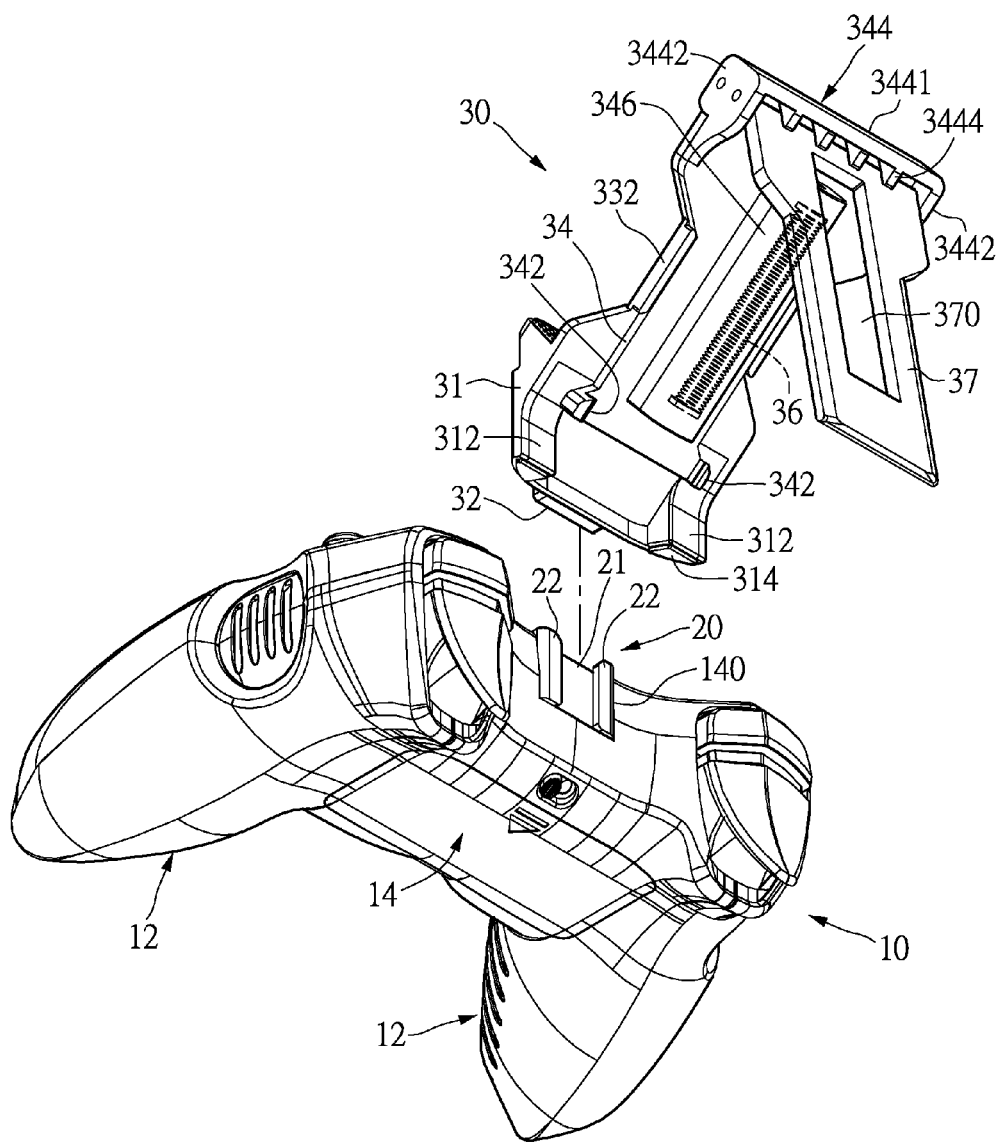
FIG. 2 is another perspective view showing the handheld game controller assembly adapted to combine with portable electronic device (separated from the external retaining device) of the instant disclosure.

Please refer to FIGS. 1 and 2 showing perspective views of handheld game controller assembly adapted to combine with various portable electronic devices (separated from an external retaining device) according to the instant disclosure. The present disclosure provides a handheld game controller assembly adapted to combine with various portable electronic devices, which includes a game controller 10, a receiving receptacle 20, and an external retaining device 30 for retaining a portable electronic device. Concerning the electrical connecting manner between the portable electronic device 40 and the game controller 10, they can be connected wirelessly, such as Bluetooth, NFC, and etc. . . . , or connected via a cable etc., or by OTG (On-the-Go).

The game controller 10 has a pair of holding portions 12 and a transversal portion 14 arranged between the pair of holding portions 12. Besides, the game controller 10 has a plurality of operation switches on a top surface thereof, such as multi-directional buttons 16*a*, navigation switches 16*b*, and controlling buttons 16*c*.

As shown in FIG. 2 of this embodiment, the transversal portion 14 of the game controller 10 has a concave portion 140. The concave portion 140 is concavely formed at a front surface of the transversal portion 14, the receiving receptacle 20 is arranged in the concave portion 140. The height of the concave portion 140 is substantially equal to the height of the receiving receptacle 20.

The receiving receptacle 20 is fixed and disposed at a front end of the transversal portion 14. Also, the receiving receptacle 20 is arranged perpendicular to a top surface of the game controller 10 in this embodiment. The receiving receptacle 20 of this embodiment can be a metallic plate made by bending, but it is not limited thereto. The receiving receptacle 20 has a base plate 21 fixed to the transversal portion 14 and a pair of side boards 22 formed at two sides of the base plate 21. An inserting slot (not labelled) is formed between the base plate 21 and the pair of side boards 22. The side boards 22 are substantially L-shaped and extending forward from two sides of the base plate 21.

The external retaining device 30 has a plugging unit 32 that is removably engaged and fixed in the receiving receptacle 20, an adaptor portion 31 connected to the plugging unit 32, a supporting board 33 obliquely extended from the adaptor portion 31, a extending board 34 slidably connected to the supporting board 33, a prop stand 37, and a pressing cover 38 pivotally connected to a top end of the extending board 34. The prop stand 37 has a top end pivotally connected to a top end of the extending board 34. The prop stand 37 is arranged at a supporting position when a bottom end of the prop stand 37 is rotated far away the extending board 34. Thus, the external retaining device 30 can stand independently. The supporting board 33 and the extending board 34 are cooperatively formed as a retaining unit to support or fix to various portable electronic devices, such as smart mobile phones and tablets. The plugging unit 32 has a contour corresponding to the shape of the inserting slot of the receiving receptacle 20.

Please refer to FIG. 1. In this embodiment, the supporting board 33 is integrally formed with the adaptor portion 31, and has a lower stopper 330 arranged adjacent to the adaptor portion 31. The extending board 34 is arranged at a bottom surface of the supporting board 33, and is able to slide upward to adapt with various sizes of portable electronic devices. Two sides of the supporting board 33 have a lateral shielding portion 332. The lateral shielding portion 332 can shield the sides of the extending board 34, so that user can hold conveniently. Besides, the lateral shielding portion 332 can stop an upward displacement of the extending board 34. In other words, the lateral shielding portion 332 can block the clipping tabs 342. The lower stopper 330 can be used independently to support the portable electronic device. Alternatively, the pressing cover 38 can be rotated upward from the top end of the extending board 34, to cooperatively hold the portable electronic device with the lower stopper 330. There is an angle between the supporting board 33 and the plugging unit 32, so that the portable electronic device can be properly disposed on the external retaining device 30 in an oblique manner.

As shown in FIG. 2, the retaining unit further includes an elastic element 36 connecting the supporting board 33 to the extending board 34. In this embodiment, the elastic element 36 is a tensioned spring, but it is not limited thereto. The elastic element 36 has one end fixed to the supporting board 33, and the other end fixed to the extending board 34. When the second arm 34 is pulled upwardly away from the first arm 33, the elastic element 36 provides the extending board 34 an elastic force toward the supporting board 33. In this embodiment, the extending board 34 has an accommodating portion 346 protruded from a bottom surface thereof. The accommodating portion 346 is substantially semi-cylinder shaped, which can be held by user to slide the extending board 34 upward. The elastic element 36 is received in the accommodating portion 346.

Figure 3:
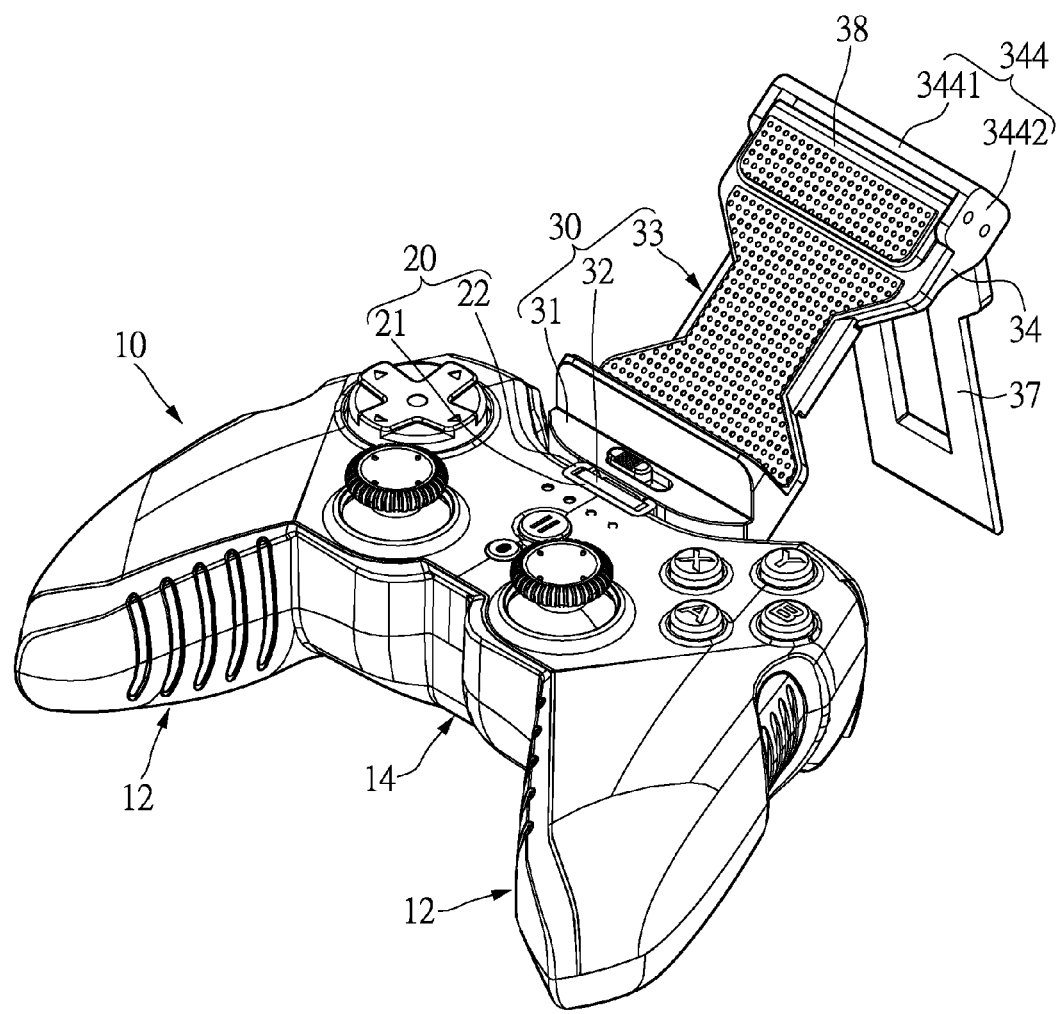
FIG. 3 is a perspective view showing the handheld game controller assembly (assembled with the external retaining device) according to the instant disclosure.
Figure 4:
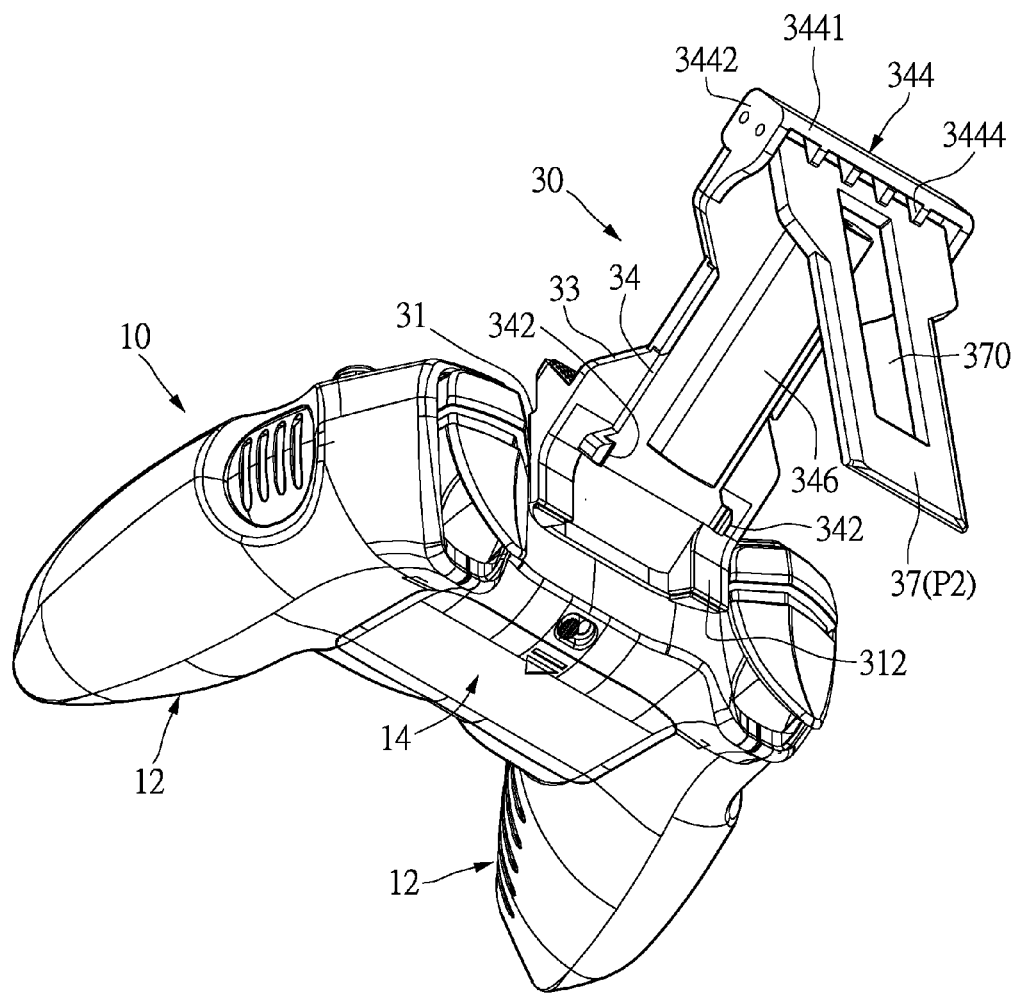
FIG. 4 is another perspective view showing the handheld game controller assembly (assembled with the external retaining device) according to the instant disclosure.

Please refer to FIGS. 3 and 4, which are perspective views of the handheld game controller assembly (assembled with an external retaining device) of the present disclosure. When the present disclosure is assembled, the plugging unit 32 of the external retaining device 30 is inserted into the top portion to the bottom portion of the receiving receptacle 20. The external retaining device 30 can be fixed to the receiving receptacle 20 by frictional force or a locking mechanism. The supporting board 33 and the extending board 34 are mutually coupled. The pressing cover 38 can be lifted upward and is operated with the lower stopper 330 to clip the portable electronic device, such as mobile phone. Alternatively, the extending board 34 can be pushed upward. The pressing cover 38 can be laid on and covering the supporting board 33, so as to retain a bigger portable electronic device, such as tablet. The supporting board 33 and the pressing cover 38 have an anti-slip pad 331, 381 attached on top surfaces thereof, respectively.

Please refer to FIGS. 3 and 4, which are perspective views of the handheld game controller assembly of the present disclosure clipped to the portable electronic device 40. When the present disclosure is assembled, the plugging unit 32 of the external retaining device 30 is inserted into the receiving receptacle 20 from the top portion to the bottom portion of the receiving receptacle 20. The external retaining device 30 can be fixed to the receiving receptacle 20 by frictional force or a locking mechanism. The first arm 33 and the second arm 34 are mutually coupled, and the portable electronic device 40 is clipped by the upper holder 341 and the lower stopper 331.

Figure 4A:
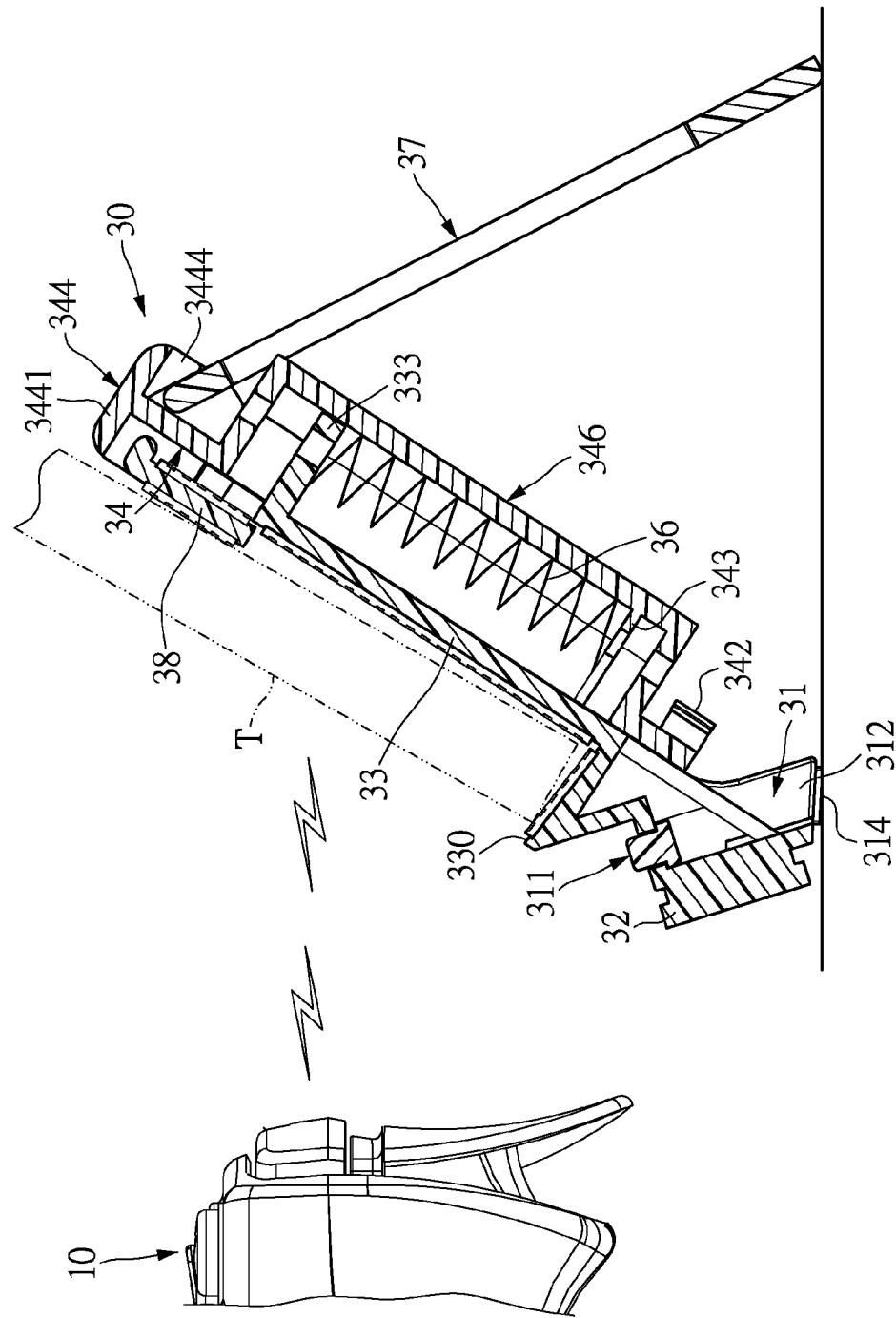
FIG. 4A is a cross-sectional view of the external retaining device of the handheld game controller assembly in a first usable position according to the instant disclosure.

Concerning the way to fix the elastic element 36, an example is illustrated as followed with reference to FIG. 4A. The first arm 33 has a first fixing part 333 extended into the accommodating portion 346 of extending board 34 and connected to a top end of the elastic element 36. The second arm 34 has a second fixing part 343 to connect the bottom end of the elastic element 36. When the second arm 34 is pulled upward, the second fixing part 343 is moved simultaneously to compress the elastic element 36. When the user releases the second arm 34, the elastic element 36 recovers and returns to the original position and a force toward the first arm 33 is provided to the second arm 34. Thus, the portable electronic device 40 can be clipped between the first arm 33 and the second arm 34. A guiding rod can be fixed to the second retaining part 343 and slidably pass through the first retaining part 333 and through the elastic element 36 if necessary.

Please refer to FIG. 1 and FIG. 3. The external retaining device 30 of this embodiment further includes a locking unit 311 arranged on the adaptor portion 31. The locking unit 311 fixes the plugging unit 32 to the receiving receptacle 20. The locking unit 311 has a sliding button 3110. The sliding button 3110 is exposed from the adaptor portion 31 and arranged adjacent to the plugging unit 32. For a preferable embodiment, the locking unit 311 is automatically locked and fixed when the plugging unit 32 of the external retaining device 30 is inserted into the receiving receptacle 20. The fixing manner can be engagement, tight matched, or inserting. The sliding button 3110 can be pushed to unlock, so that the external retaining device 30 can be removed from the receiving receptacle 20.

Please refer to FIG. 2 and FIG. 4. Concerning the positions of the external retaining device 30, the bottom end of the prop stand 37 can be rotated outward and far away from the extending board 34, which can be defined as a supporting position (P2). Further, the adaptor portion 31 has a pair of leg portions 312. The leg portion 312 preferably has a skid-proof pad 314 fixed on a bottom surface thereof. The pair of leg portions 312 and the bottom end of the prop stand 37 can make the external retaining device 30 erect independently. Moreover, a part of prop stand 37 can be accommodated between the two leg portions 312.

Figure 5:
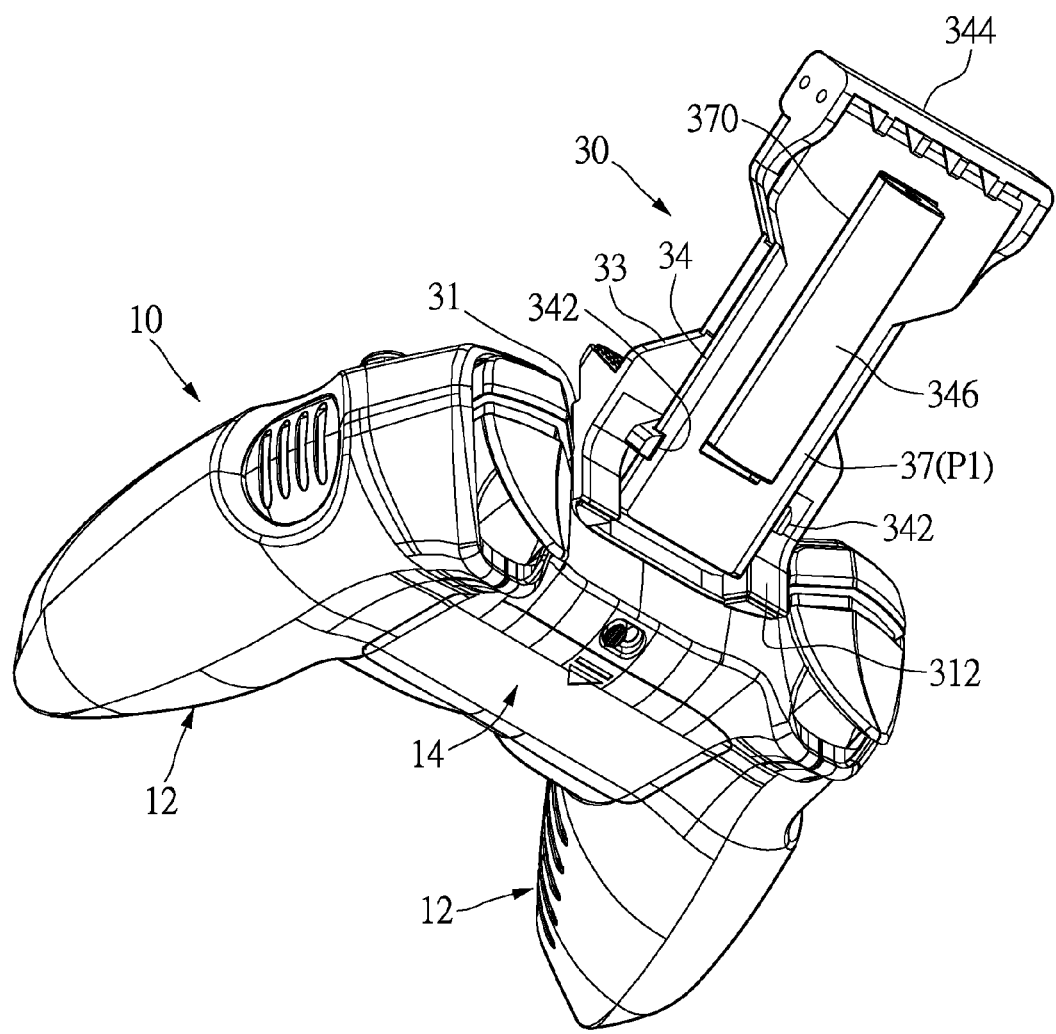
FIG. 5 is an illustrative view showing of the external retaining device of the handheld game controller assembly arranged in a withdraw position according to the instant disclosure.

Please refer to FIG. 4 and FIG. 5. FIG. 5 is a perspective view of the external retaining device of the handheld game controller assembly arranged in a withdraw position. The prop stand 37 has a through hole 370 corresponding to a contour of the accommodating portion 346. The extending board 34 has a pair of clipping tabs 342 proximate to the adaptor portion 31. As shown in FIG. 5, the withdraw position (P1) is a position when the prop stand 37 is rotated to cover on the extending board 34. The accommodating portion 346 passes through the through hole 370. The pair of clipping tabs 342 fastens two sides of the prop stand 37, so that the prop stand 37 is engaged and proximate to the extending board 34.

Please refer to FIG. 4 and FIG. 4A. In this embodiment, a top end of the extending board 34 has a pivoting seat 344. The pivoting seat 344 has a plurality of locating blocks 3444 protruding toward the prop stand 37. The locating blocks 3444 are formed on an inner surface of the pivoting seat 344 facing the prop stand 37. The quantity of the locating block 3444 can be at least one, and the shape can be triangular. The locating blocks 3444 block the prop stand 37 at the supporting position (P2). In more details, the pivoting seat 37 includes a top board 3441 connected substantially perpendicularly to the top end of the extending board 34, and a pair of side boards 3442 located at two sides of the extending board 34. One end of the prop stand 37 and one end of the pressing cover 38 are pivotally connected to the pair of side boards 3442, respectively.

As shown in FIG. 4A, when the prop stand 37 is arranged in the supporting position (P2), the prop stand 37 and the pair of leg portions 312 can make the external retaining device 30 independently and firmly erected on a table. The pressing cover 38 covers the supporting board 33. The external retaining device 30 can independently support a heavier tablet T. The game controller 10 can be operated and separated from the external retaining device 30.

Figure 4B:
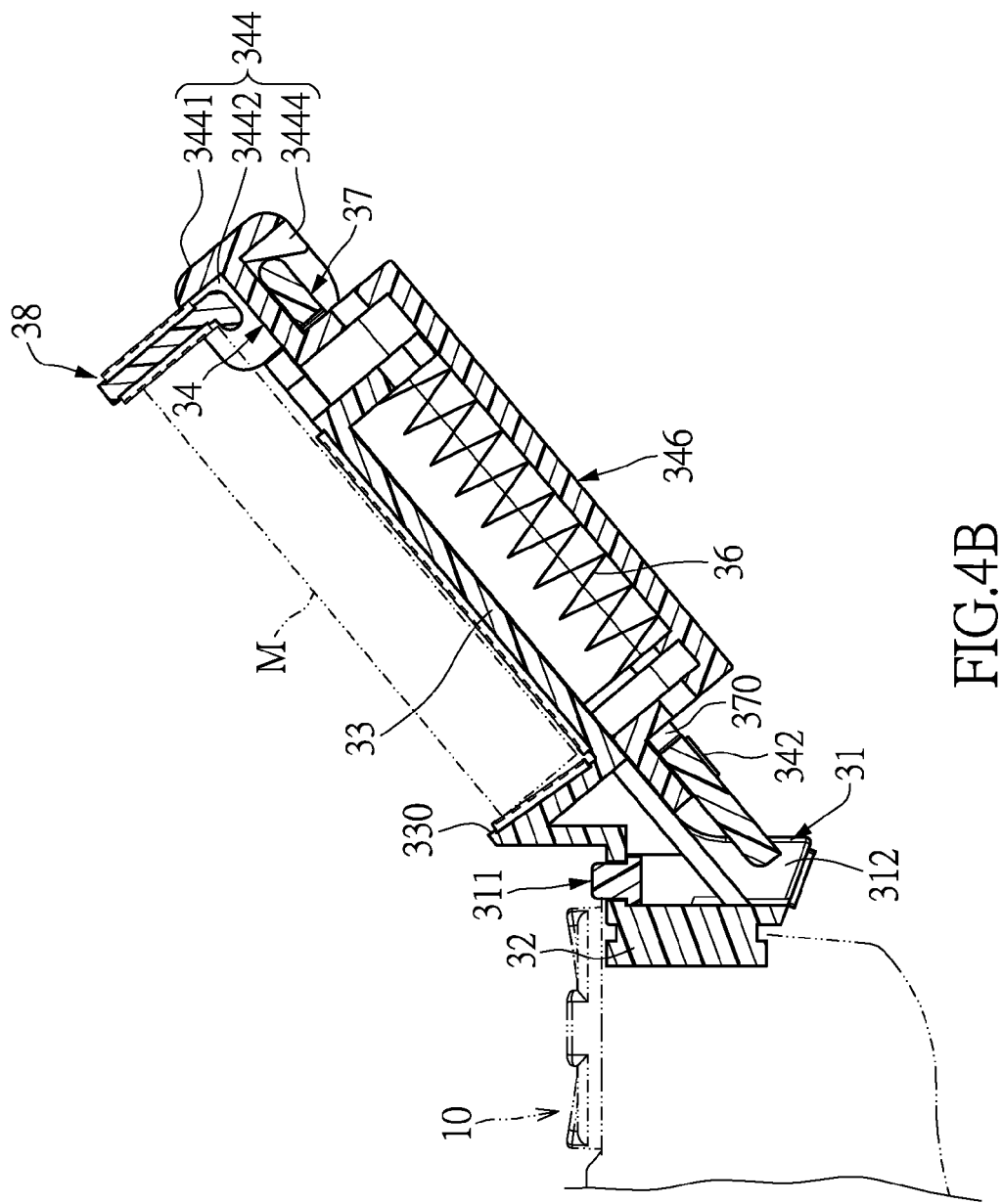
FIG. 4B is a cross-sectional view of the external retaining device the handheld game controller assembly in a second usable position according to the instant disclosure.

As shown in FIG. 4B, a cross-sectional view of the external retaining device 30 is shown with a mobile phone M arranged in transverse manner. The external retaining device 30 is combined with the game controller 10 and the mobile phone M is transversely retained on the supporting board 33. The pressing cover 38 is rotated upward to cooperatively retain the mobile phone M with the lower stopper 330 on the external retaining device 30. Meanwhile, the prop stand 37 can be drawn toward the plugging unit 32 and be engaged by the clipping tabs 342 proximate to extending board 34.

Figure 4C:
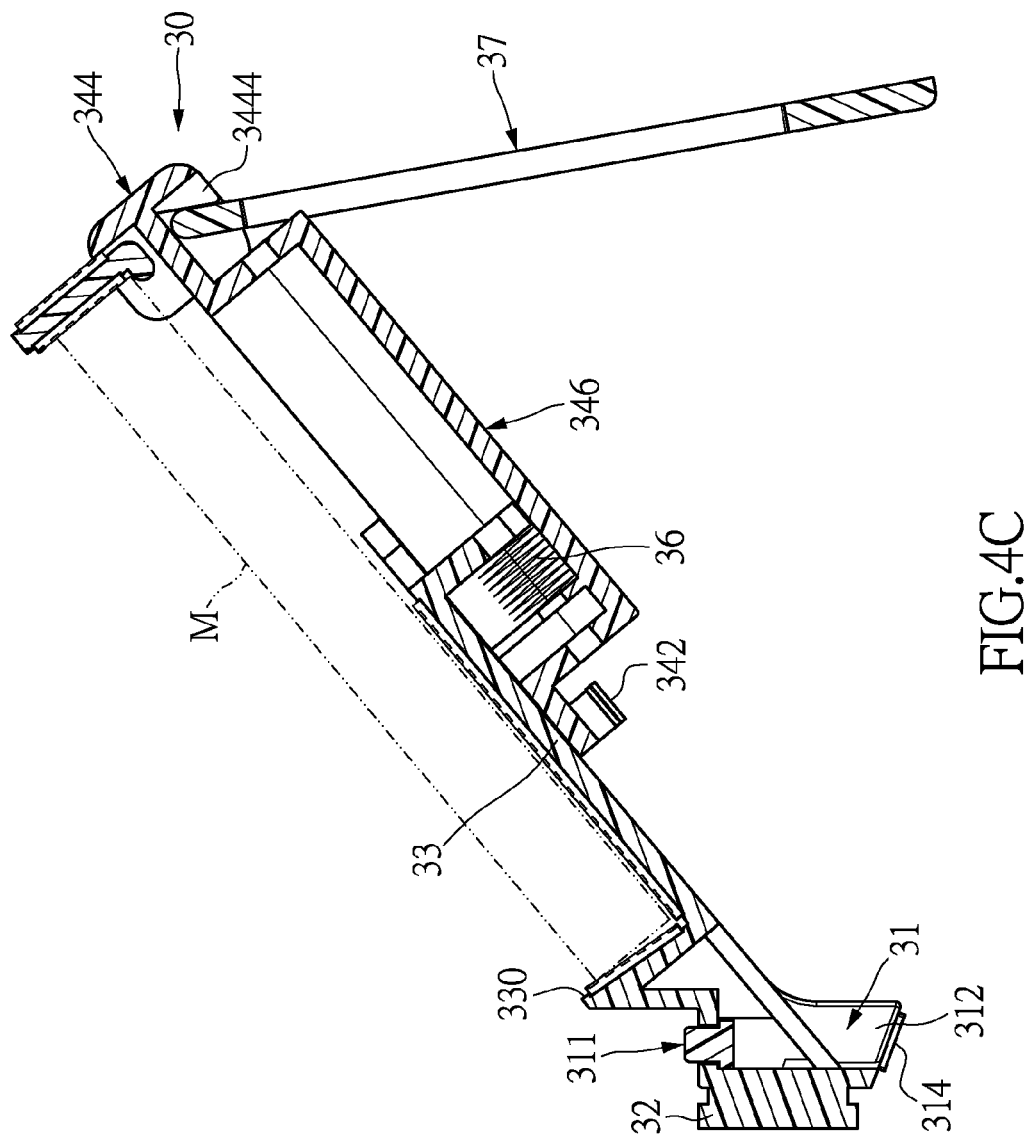
FIG. 4C is a cross-sectional view of the external retaining device the handheld game controller assembly in a third usable position according to the instant disclosure.

As shown in FIG. 4C, a cross-sectional view of the external retaining device 30 is shown with a mobile phone M arranged in an erected manner. The external retaining device 30 is combined with the game controller 10 and the pressing cover 38 is rotated upward. The extending board 34 is slided upward along the bottom surface of the supporting board 33, so as to enlarge the space to retain the mobile phone M. The mobile phone M is disposed on the supporting board 33 in an erective manner. The pressing cover 38 and the lower stopper 330 cooperatively retains the mobile phone M on the external retaining device 30. In the meanwhile, the prop stand 37 can be rotated away from the extending board 34 and stood on a table with the leg portions 312, so that the external retaining device 30 can standup independently. Alternatively, the prop stand 37 can be withdrawn into the withdraw position as shown in FIG. 4B.

Figure 6:
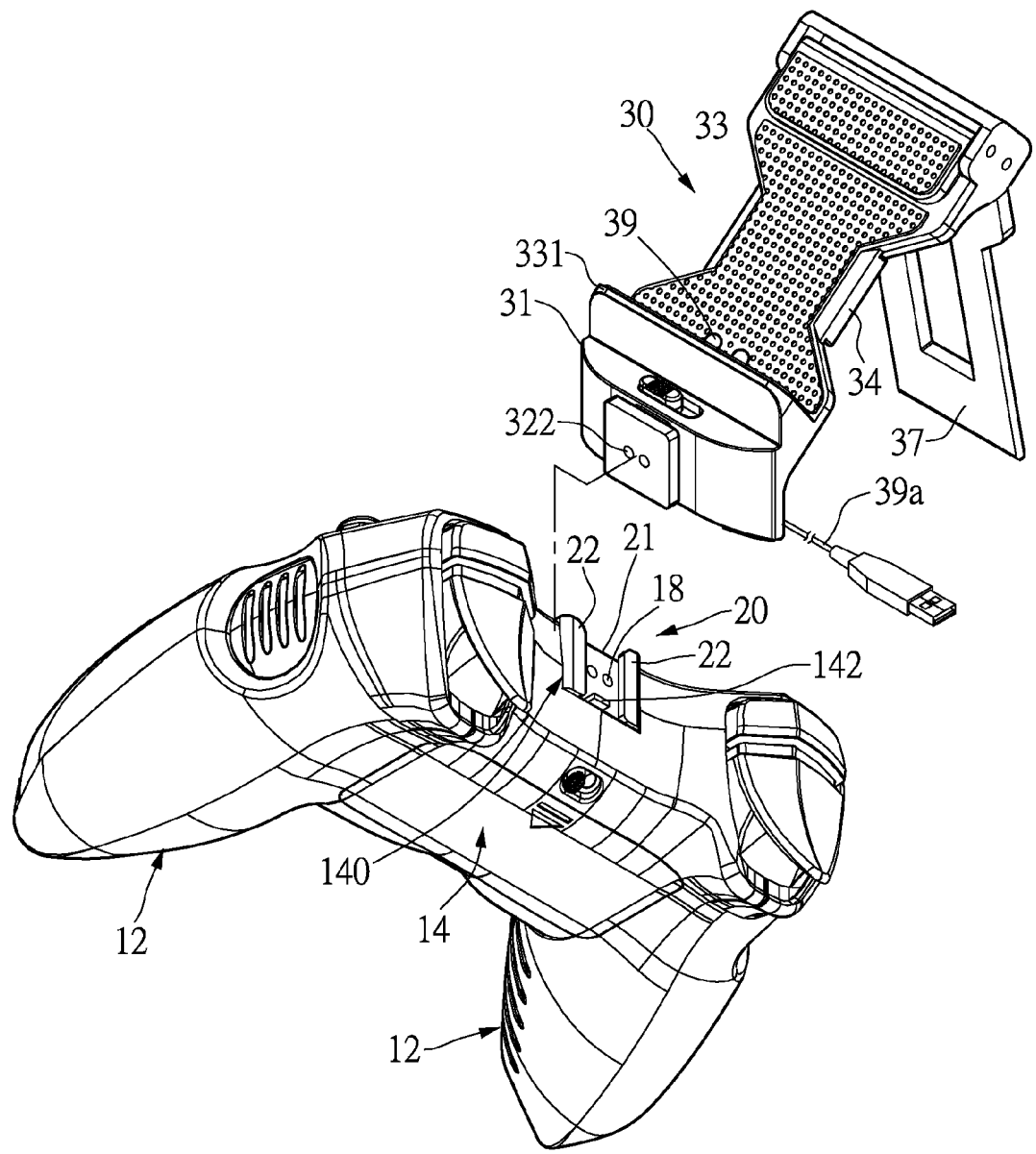
FIG. 6 is a perspective view showing a handheld game controller assembly of second embodiment according to the instant disclosure.

Please refer to FIG. 6, which shows a handheld game controller assembly adapted to combine with various portable electronic devices of second embodiment according to the present disclosure. The difference between this embodiment and the above embodiment is that the game controller 10 further has a detecting switch 142 arranged adjacent to the concave portion 140. When the plugging unit 32 of the external retaining device 30 is engaged to the receiving receptacle 20, the detecting switch 142 is activated, so as to automatically rotate on or activate the electronic element connected to the portable electronic device 40 via Bluetooth or NFC (Near Field Communication).

Besides, the receiving receptacle 20 has a plurality of first conductive terminals 18, which are electrically connected to the game controller 10, whereas the first conductive terminals 18 are exposed from the inserting slot (not labeled). The external retaining device 30 has a plurality of second conductive terminals 322 fixed in the plugging unit 32. When the external retaining device 30 is fixed to the game controller 10, the second conductive terminals 322 are electrically connected to the first conductive terminals 18 and can be arranged to electrically connect to the portable electronic device 40 that is retained on the retaining unit. A connector 39 can be set on the lower stopper 330 of the first arm 33. The connector 39 of this embodiment is exposed on the top surface of the lower stopper 330, and it can be elastic terminals or in other manner, to electrically connect to the portable electronic device 40, such as contacts on a peripheral cradle arranged at one side of a smart phone or a tablet.

Besides the external retaining device 30, this embodiment can also provide a cable 39a to electrically connect the second conductive terminals 322 of the external retaining device 30 to the game controller 10. The cable 39a can be extended from the bottom of the adaptor portion 31 outwardly, which can transfer signals or electrical power between the game controller 10 and the portable electronic device 40.

In summary, the external retaining device 30 of this embodiment can be detachably assembled with the game controller 10, to retain various portable electronic devices, such as mobile phone M and tablet T, when required. Therefore, user can operate the portable electronic device by the game controller 10. The external retaining device 30 can be easily and quickly assembled to the game controller 10 when required. The external retaining device 30 can stand independently to support the portable electronic device. The assembling manner between the receiving receptacle 20 and the plugging unit 32 can provide well supporting force. Moreover, the retaining unit, which is formed by the supporting board 33 and the extending board 34, can be adjusted to form different space, so that various portable electronic devices can be retained thereon.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A handheld game controller assembly adapted to combine with various portable electronic devices, comprising:
   a game controller, having a pair of holding portions and a transversal portion arranged between the pair of holding portions;
   a receiving receptacle, fixed and arranged at a front end of the transversal portion; and
   an external retaining device, including
      a plugging unit detachably engaged with and fixed to the receiving receptacle;
      an adaptor portion connected to the plugging unit;
      a supporting board extended obliquely from the adaptor portion;
      an extending board slidably connected to the supporting board;
      a prop stand, having a top end pivotally connected to a top end of the extending board, wherein a bottom end of the prop stand is rotatable away from the extending board in a supporting position, thereby the external retaining device is independently erected; and
      a pressing cover pivotally connected to the top end of the extending board;
      wherein the extending board is arranged at a bottom surface of the supporting board, wherein an accommodating portion is protruded from a bottom surface of the extending board, the accommodating portion has an elastic element connected to the supporting board and the extending board,
      wherein the prop stand has a through hole corresponding to a contour of the accommodating portion, wherein the extending board has a pair of clipping tabs arranged adjacent to the adaptor portion, wherein the prop stand is rotated towards the extending board to a withdraw position, the accommodating portion passes through the through hole, and the pair of clipping tabs fasten two sides of the prop stand.

2. The handheld game controller assembly according to claim 1, wherein the transversal portion of the game controller is formed with a concave portion thereon, the receiving receptacle is arranged in the concave portion, wherein the receiving receptacle includes a base plate fixed on the transversal portion and a pair of side boards arranged at two sides of the base plate, and an inserting slot is formed between the base plate and the pair of side boards, wherein the plugging unit has a shape conforming to the shaped of the inserting slot.

3. The handheld game controller assembly according to claim 1, wherein the adaptor portion has a pair of leg portions, the external retaining device is independently erected through the pair of leg portions and the bottom end of the prop stand, wherein a part of the prop stand is received between the pair of leg portions.

4. The handheld game controller assembly according to claim 3, wherein the external retaining device further has a locking unit arranged in the adaptor portion, so as to fix the plugging unit to the receiving receptacle, the locking unit has a sliding button arranged adjacent to the plugging unit.

5. The handheld game controller assembly according to claim 1, wherein a top end of the extending board has a pivoting seat, the pivoting seat has at least one locating block protruding towards the prop stand, the at least one locating block blocks the prop stand in the supporting position.

6. The handheld game controller assembly according to claim 5, wherein the pivoting seat includes a top board connected substantially perpendicularly to the top end of the extending board, and a pair of side boards arranged at two sides of the extending board, wherein one end of the prop stand and one end of the pressing cover are pivotally connected to the pair of side boards, respectively.

7. The handheld game controller assembly according to claim 2, wherein the receiving receptacle has a plurality of first conductive terminals electrically connected to the game controller, and the first conductive terminals are exposed from the inserting slot; wherein the external retaining device has a plurality of second conductive terminals fixed in the plugging unit, when the external retaining device is fixed to the game controller, the second conductive terminals are electrically connected to the first conductive terminals so as to electrically connect to a portable electronic device retained on the external retaining device.

8. The handheld game controller assembly according to claim 7, wherein the external retaining device further includes a connector arranged on the supporting board, the connector is electrically connected to the second conductive terminals for electrically connecting to the portable electronic device, wherein the supporting board has a lower stopper, wherein the connector is exposed from a top surface of the lower stopper.

9. The handheld game controller assembly according to claim 8, wherein the external retaining device further includes a cable electrically connected to the second conductive terminals, wherein the cable is selectively and electrically connected to the portable electronic device.

10. A handheld game controller assembly adapted to combine with various portable electronic devices, comprising:
    a game controller, having a pair of holding portions and a transversal portion arranged between the pair of holding portions;
    a receiving receptacle, fixed and arranged at a front end of the transversal portion; and
    an external retaining device, including
       a plugging unit detachably engaged with and fixed to the receiving receptacle;
       an adaptor portion connected to the plugging unit;
       a supporting board extended obliquely from the adaptor portion;
       an extending board slidably connected to the supporting board;
       a prop stand, having a top end pivotally connected to a top end of the extending board, wherein a bottom end of the prop stand is rotatable away from the extending board in a supporting position, thereby the external retaining device is independently erected; and
       a pressing cover pivotally connected to the top end of the extending board;
       wherein the extending board is arranged at a bottom surface of the supporting board, wherein an accommodating portion is protruded from a bottom surface of the extending board, the accommodating portion has an elastic element connected to the supporting board and the extending board;

wherein a top end of the extending board has a pivoting seat, the pivoting seat has at least one locating block protruding towards the prop stand, the at least one locating block blocks the prop stand in the supporting position.

11. A handheld game controller assembly adapted to combine with various portable electronic devices, comprising:

a game controller, having a pair of holding portions and a transversal portion arranged between the pair of holding portions;

a receiving receptacle, fixed and arranged at a front end of the transversal portion; and an external retaining device, including
a plugging unit detachably engaged with and fixed to the receiving receptacle;
an adaptor portion connected to the plugging unit;
a supporting board extended obliquely from the adaptor portion;
an extending board slidably connected to the supporting board;
a prop stand, having a top end pivotally connected to a top end of the extending board, wherein a bottom end of the prop stand is rotatable away from the extending board in a supporting position, thereby the external retaining device is independently erected; and
a pressing cover pivotally connected to the top end of the extending board;

wherein the transversal portion of the game controller is formed with a concave portion thereon, the receiving receptacle is arranged in the concave portion, wherein the receiving receptacle includes a base plate fixed on the transversal portion and a pair of side boards arranged at two sides of the base plate, and an inserting slot is formed between the base plate and the pair of side boards, wherein the plugging unit has a shape conforming to the shaped of the inserting slot;

wherein the receiving receptacle has a plurality of first conductive terminals electrically connected to the game controller, and the first conductive terminals are exposed from the inserting slot; wherein the external retaining device has a plurality of second conductive terminals fixed in the plugging unit, when the external retaining device is fixed to the game controller, the second conductive terminals are electrically connected to the first conductive terminals so as to electrically connect to a portable electronic device retained on the external retaining device;

wherein the external retaining device further includes a connector arranged on the supporting board, the connector is electrically connected to the second conductive terminals for electrically connecting to the portable electronic device, wherein the supporting board has a lower stopper, wherein the connector is exposed from a top surface of the lower stopper.

* * * * *